(12) United States Patent
Matsuo et al.

(10) Patent No.: US 9,643,356 B2
(45) Date of Patent: May 9, 2017

(54) JOINT STRUCTURE AND JOINT STRUCTURE MANUFACTURING METHOD

(71) Applicant: TOYOTA JIDOSHA KABUSHIKI KAISHA, Toyota (JP)

(72) Inventors: Yasuhide Matsuo, Toyota (JP); Hiroyuki Kurokawa, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/901,144

(22) PCT Filed: Jun. 9, 2014

(86) PCT No.: PCT/JP2014/065254
§ 371 (c)(1),
(2) Date: Dec. 28, 2015

(87) PCT Pub. No.: WO2015/015906
PCT Pub. Date: Feb. 5, 2015

(65) Prior Publication Data
US 2016/0136880 A1    May 19, 2016

(30) Foreign Application Priority Data

Jul. 29, 2013  (JP) ................. 2013-156869

(51) Int. Cl.
*F16B 37/06* (2006.01)
*B29C 65/72* (2006.01)
(Continued)

(52) U.S. Cl.
CPC ............. *B29C 65/72* (2013.01); *B21J 15/025* (2013.01); *B21J 15/147* (2013.01); *B23K 11/11* (2013.01);
(Continued)

(58) Field of Classification Search
CPC .... F16B 5/04; F16B 5/08; F16B 19/04; F16B 19/06; F16B 19/1027; F16B 2019/006; F16B 37/06; B29C 65/72
(Continued)

(56) References Cited

U.S. PATENT DOCUMENTS

| 982,078 | A | * | 1/1911 | Link | ....................... F16B 19/06 29/509 |
| 2,321,201 | A | * | 6/1943 | Heilman | ............... F16B 37/061 219/107 |

(Continued)

FOREIGN PATENT DOCUMENTS

| DE | 10 2010 026 040 A1 | 1/2012 |
| DE | 10 2010 053 608 A1 | 6/2012 |

(Continued)

OTHER PUBLICATIONS

International Search Report issued Sep. 2, 2014 in PCT/JP2014/065254 (with English language translation).

*Primary Examiner* — Roberta Delisle
(74) *Attorney, Agent, or Firm* — Oblon, McClelland, Maier & Neustadt, L.L.P.

(57) ABSTRACT

The present invention provides a joint structure having: a first panel comprising a first material; a second panel comprising a metal material different from the first material; a rivet having a head portion that is placed in contact with the first panel, a shaft portion that is passed through the first panel, and a joint portion that is disposed on the shaft portion side and is in contact with and joined by welding to the second panel; and a sandwiching portion that is disposed at the rivet and sandwiches between itself and the head portion the first panel from the second panel side.

10 Claims, 5 Drawing Sheets

(51) Int. Cl.
*B23K 11/11* (2006.01)
*B23K 11/20* (2006.01)
*F16B 19/06* (2006.01)
*B21J 15/02* (2006.01)
*B21J 15/14* (2006.01)
*F16B 5/04* (2006.01)
*F16B 5/08* (2006.01)
*B29C 65/48* (2006.01)
*B29C 65/56* (2006.01)
*B29C 65/64* (2006.01)
*B29C 65/00* (2006.01)
*B29L 31/30* (2006.01)

(52) U.S. Cl.
CPC .............. *B23K 11/20* (2013.01); *B29C 65/48* (2013.01); *B29C 65/562* (2013.01); *B29C 65/64* (2013.01); *B29C 66/1122* (2013.01); *B29C 66/21* (2013.01); *B29C 66/41* (2013.01); *B29C 66/7212* (2013.01); *B29C 66/74283* (2013.01); *F16B 5/04* (2013.01); *F16B 5/08* (2013.01); *F16B 19/06* (2013.01); *B29C 66/81422* (2013.01); *B29C 66/832* (2013.01); *B29L 2031/3002* (2013.01)

(58) Field of Classification Search
USPC .................................. 411/171, 500, 501, 503
See application file for complete search history.

(56) References Cited

U.S. PATENT DOCUMENTS

| | | | | |
|---|---|---|---|---|
| 2,327,924 A * | 8/1943 | Mounts | ................. | B25G 3/26 219/94 |
| 2,405,897 A * | 8/1946 | Milone | ................. | F16B 19/10 29/243.522 |
| 3,030,850 A * | 4/1962 | Minor | ................. | B21J 15/04 29/509 |
| 3,341,943 A * | 9/1967 | Gwyn, Jr. | ............ | H01H 11/041 200/267 |
| 3,655,424 A * | 4/1972 | Orowan | ................. | F16B 5/04 29/458 |
| 4,112,993 A * | 9/1978 | Dey | ................. | F16B 19/1027 16/2.1 |
| 4,510,171 A * | 4/1985 | Siebert | ................. | B23K 9/23 228/165 |
| 5,147,167 A * | 9/1992 | Berecz | ................. | F16B 5/01 411/339 |
| 7,347,641 B2 * | 3/2008 | Prichard | ................. | B21J 15/02 29/524.1 |
| 7,351,022 B2 * | 4/2008 | Denslow | ................. | F16B 5/04 411/501 |
| 7,645,105 B2 * | 1/2010 | Hengel | ............. | B23K 11/0053 219/93 |
| 8,764,363 B2 * | 7/2014 | Yang | ................. | F16B 19/08 411/339 |
| 8,844,868 B2 * | 9/2014 | Kolax | ................. | B64C 1/064 244/119 |
| 2011/0097142 A1* | 4/2011 | Bassler | ............. | B23K 11/0046 403/337 |
| 2014/0369788 A1* | 12/2014 | Chang | ................. | F16B 19/008 411/501 |

FOREIGN PATENT DOCUMENTS

| | | |
|---|---|---|
| EP | 1 138 430 A2 | 10/2001 |
| JP | 10-47323 A | 2/1998 |
| JP | 11-270523 A | 10/1999 |
| JP | 2010-207898 A | 9/2010 |
| JP | 2012-111090 A | 6/2012 |

* cited by examiner

JOINT STRUCTURE AND JOINT STRUCTURE MANUFACTURING METHOD

TECHNICAL FIELD

The present invention relates to a joint structure for joining different types of materials to one another and a joint structure manufacturing method.

BACKGROUND ART

Patent Document 1 (JP-A No. 2010-207898) discloses a structure where, as different types of materials, a panel made of iron and a panel made of aluminum alloy are joined to one another using a rivet. In this structure, a shaft portion of the rivet is passed through the panel made of aluminum alloy, the distal end of the shaft portion of the rivet is brought into contact with the panel made of iron, and in this state the shaft portion of the rivet and the panel made of iron are joined to one another by spot welding.

PRIOR ART DOCUMENTS

Patent Documents

Patent Document 1: JP-A No. 2010-207898

SUMMARY OF INVENTION

Technical Problem

In the structure described in patent document 1 (JP-A No. 2010-207898), the shaft portion of the rivet contracts and is welded to the panel made of iron, so a stable space cannot be ensured between the panel made of iron and the panel made of aluminum alloy and there is the potential for instability to arise. For this reason, there is room to improve joint stability during the welding.

In consideration of the circumstances described above, it is an object of the present invention to obtain a joint structure that can improve joint stability when joining two panels serving as different types of materials to one another using a rivet and a joint structure manufacturing method.

Solution to Problem

A joint structure of a first aspect of the present invention comprises: a first panel comprising a first material; a second panel comprising a metal material different from the first material; a rivet having a head portion that is placed in contact with the first panel, a shaft portion that is passed through the first panel, and a joint portion that is disposed on the shaft portion side and is in contact with and joined by welding to the second panel; and a sandwiching portion that is disposed at the rivet and sandwiches, between itself and the head portion, the first panel from the second panel side, wherein the rivet is divided into a first rivet that is equipped with the head portion and the shaft portion and a second rivet that is at least equipped with the joint portion, is in contact with the first rivet, and is in contact with the second panel, just the shaft portion of the first rivet is in contact with a through hole running through the first panel, and the sandwiching portion is a seat portion that is formed at the second rivet and is in contact with the first panel and the second panel in a region around the through hole at which the shaft portion passes through the first panel.

A joint structure of a third aspect of the present invention is the joint structure of the first aspect, wherein an engagement portion engaged with an engagement counterpart portion formed at the second rivet is formed at the first rivet.

A joint structure of a fourth aspect of the present invention comprises: a first panel comprising a first material; a second panel comprising a metal material different from the first material; a rivet having a head portion that is placed in contact with the first panel, a shaft portion that is passes through the first panel, and a joint portion that is disposed on the shaft portion side and is in contact with and joined by welding to the second panel; and a sandwiching portion that is disposed at the rivet and sandwiches, between itself and the head portion, the first panel from the second panel side, wherein the sandwiching portion is configured by a claw portion that is in contact with a site of the first panel on the second panel side on an outer peripheral side of the shaft portion in a state in which the shaft portion has been passed through the first panel, and the shaft portion or the joint portion is formed longer in an axial direction than the claw portion.

A joint structure of a fifth aspect of the present invention is the joint structure of the first aspect, the third aspect, or the fourth aspect, wherein a region between the first panel and the second panel in an area around the rivet is filled with an adhesive.

A joint structure of a sixth aspect of the present invention is the joint structure of the first aspect and the third aspect to the fifth aspect, wherein the first material is a resin.

A joint structure manufacturing method of a seventh aspect of the present invention is a manufacturing method for manufacturing the joint structure of the first aspect, the joint structure manufacturing method comprising: a step of passing the shaft portion disposed at the first rivet through the first panel; a step of sandwiching, with the head portion and the seat portion, the first panel by bringing the head portion into contact with the first panel, bringing the second rivet into contact with the first rivet, and bringing the seat portion of the second rivet into contact with the first panel; and a step of bringing the second panel into contact with the seat portion and securing at least the joint portion of the second rivet and the second panel to one another by welding.

A joint structure manufacturing method of a ninth aspect of the present invention is a manufacturing method for manufacturing a joint structure having a first panel comprising a first material, a second panel comprising a metal material different from the first material, a rivet having a head portion that is placed in contact with the first panel, a shaft portion that is passed through the first panel, and a joint portion that is disposed on the shaft portion side and is in contact with and joined by welding to the second panel, and a sandwiching portion that is disposed at the rivet and sandwiches, between itself and the head portion, the first panel from the second panel side, the sandwiching portion being configured by a claw portion that is in contact with a site of the first panel on the second panel side on an outer peripheral side of the shaft portion in a state in which the shaft portion has been passed through the first panel, and the shaft portion or the joint portion being formed longer in an axial direction than the claw portion, the joint structure manufacturing method comprising: a step of passing the shaft portion and the claw portion of the rivet through the first panel; a step of deforming the claw portion to thereby bring the claw portion into contact with the site of the first panel on the second panel side and sandwiching the first panel between the head portion and the claw portion; and a step of bringing the joint portion into contact with the second panel and securing the joint portion and the second panel to one another by welding.

A joint structure manufacturing method of a tenth aspect of the present invention is the joint structure manufacturing method of the seventh aspect, wherein in the step of bringing the second rivet into contact with the first rivet and bringing the seat portion of the second rivet into contact with the first panel, an engagement portion disposed at the first rivet is brought into engagement with an engagement counterpart portion disposed at the second rivet.

A joint structure manufacturing method of an eleventh aspect of the present invention is the joint structure manufacturing method of the seventh aspect or the ninth aspect, further comprising a step of applying an adhesive to the first panel or the second panel at least in an area around the joint portion before the step of securing by welding.

A joint structure manufacturing method of a twelfth aspect of the present invention is the joint structure manufacturing method of any one of the seventh aspect and the ninth aspect to the eleventh aspect, wherein the first material forming the first panel is a resin.

According to the joint structure of the first aspect of the present invention, the shaft portion of the rivet is passed through the first panel comprising the first material, and the head portion of the rivet is placed in contact with the first panel. The sandwiching portion is disposed at the rivet, and the first panel is sandwiched between the head portion of the rivet and the sandwiching portion from the second panel side. In this state, the joint portion disposed on the shaft portion side of the rivet is in contact with the second panel comprising a metal material different from the first material, and the joint portion of the rivet and the second panel are joined to one another by welding. In this joint structure, both surfaces of the first panel are sandwiched between the head portion of the rivet and the sandwiching portion, so the joint portion of the rivet can be brought into contact with the second panel in a state in which a space between the first panel and the second panel is ensured, and joint stability during the welding can be improved.

Furthermore, the rivet is divided into the first rivet and the second rivet, the head portion of the first rivet is placed in contact with the first panel, and just the shaft portion of the first rivet is in contact with the through hole running through the first panel. The second rivet is placed in contact with the first rivet and in contact with the second panel. At that time, the seat portion of the second rivet is in contact with the first panel and the second panel in the region around the through hole at which the shaft portion of the first rivet passes through the first panel. Because of this, the seat portion of the second rivet is in stable contact with the second panel, so joint stability when welding the joint portion of the second rivet and the second panel to one another is improved. Furthermore, because of the seat portion, the space between the first panel and the second panel is stably maintained, so, for example, division of electrical current when performing resistance welding can be controlled and the occurrence of weld defects can be prevented or controlled.

According to the joint structure of the third aspect of the present invention, the engagement portion of the first rivet is engaged with the engagement counterpart portion of the second rivet, so it becomes easy to put together the first rivet and the second rivet and workability is improved.

According to the joint structure of the fourth aspect of the present invention, the claw portion is in contact with the site of the first panel on the second panel side on the outer peripheral side of the shaft portion in a state in which the shaft portion of the rivet has been passed through the first panel, so the first panel is sandwiched between the head portion and the claw portion of the rivet. The shaft portion or the joint portion of the rivet is formed longer in the axial direction than the claw portion, and the joint portion is welded to the second panel. Because of this, the first panel and the second panel can be joined to one another by the single rivet. Furthermore, the space between the first panel and the second panel is stably maintained because the first panel is sandwiched between the head portion and the claw portion of the rivet and the joint portion of the rivet is in contact with the second panel, so joint stability during the welding is improved. Moreover, for example, division of electrical current when performing resistance welding can be controlled and the occurrence of weld defects can be prevented or controlled.

According to the joint structure of the fifth aspect of the present invention, the region between the first panel and the second panel in the area around the rivet is filled with the adhesive, and the occurrence of corrosion caused by galvanic corrosion between the first panel and the rivet and the second panel can be controlled.

According to the joint structure of the sixth aspect of the present invention, the first material forming the first panel is the resin, so the joint structure can be made lightweight compared to a case where the first panel is formed of a metal material such as a steel panel.

According to the joint structure manufacturing method of the seventh aspect of the present invention, the first panel is sandwiched by the head portion of the first rivet and the seat portion of the second rivet by passing the shaft portion disposed at the first rivet through the first panel, bringing the head portion of the first rivet into contact with the first panel, bringing the second rivet into contact with the first rivet, and bringing the seat portion of the second rivet into contact with the first panel. Moreover, the second panel is brought into contact with the seat portion of the second rivet, and at least the joint portion of the second rivet and the second panel are secured to one another by welding. In this aspect, both surfaces of the first panel are sandwiched between the head portion of the first rivet and the seat portion of the second rivet, so the seat portion of the second rivet can be brought into contact with the second panel in a state in which a space between the first panel and the second panel is ensured.

Furthermore, the seat portion of the second rivet is in stable contact with the second panel, so joint stability when welding the joint portion and the second panel to one another is improved. Furthermore, because of the seat portion, the space between the first panel and the second panel is stably maintained, so, for example, division of electrical current when performing resistance welding can be controlled and the occurrence of weld defects can be prevented or controlled.

According to the joint structure manufacturing method of the ninth aspect of the present invention, the shaft portion and the claw portion of the rivet are passed through the first panel, the claw portion is deformed to thereby bring the claw portion into contact with the site of the first panel on the second panel side, and the first panel is sandwiched between the head portion and the claw portion. Moreover, the joint portion of the rivet is brought into contact with the second panel, and the joint portion and the second panel are secured to one another by welding. Because of this, the first panel and the second panel can be joined to one another by the single rivet. Furthermore, the space between the first panel and the second panel is stably maintained because the first panel is sandwiched between the head portion and the claw portion of the rivet and the joint portion of the rivet is in contact with the second panel, so joint stability during the welding is improved. Moreover, for example, division of electrical current when performing resistance welding can be controlled and the occurrence of weld defects can be prevented or controlled.

According to the joint structure manufacturing method of the tenth aspect of the present invention, the engagement portion of the first rivet is brought into engagement with the engagement counterpart portion of the second rivet, so it becomes easy to put together the first rivet and the second rivet and workability is improved.

According to the joint structure manufacturing method of the eleventh aspect of the present invention, the method further comprises the step of applying the adhesive to the first panel or the second panel at least in the area around the joint portion before the step of securing by welding. For this reason, because of the adhesive, the occurrence of corrosion caused by galvanic corrosion between the first panel and the rivet and the second panel can be controlled.

According to the joint structure manufacturing method of the twelfth aspect of the present invention, the first material forming the first panel is the resin, so the joint structure can be made lightweight compared to a case where the first panel is formed of a metal material such as a steel panel.

Advantageous Effects Of Invention

According to the joint structure and the joint structure manufacturing method of the present invention, joint stability can be improved when joining two panels serving as different types of materials to one another using a rivet.

DESCRIPTION OF EMBODIMENTS

A first embodiment of a joint structure pertaining to the present invention will be described below using FIG. 1.

Figure 1:
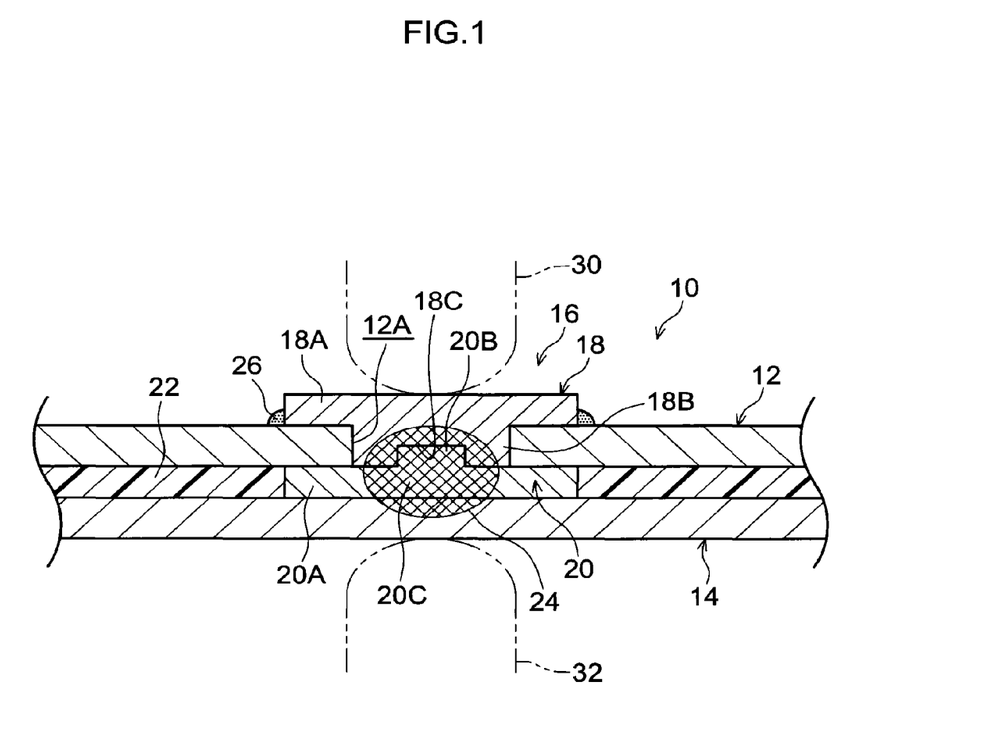
FIG. 1 is a cross-sectional view showing a joint structure pertaining to a first embodiment.

As shown in FIG. 1, a joint structure 10 of the present embodiment is equipped with a first panel 12 serving as a first panel comprising a first material, a second panel 14 serving as a second panel comprising a metal material different from the first material, and a rivet 16 for joining the first panel 12 and the second panel 14 to one another. The rivet 16 is divided into a first rivet 18 placed on the side of the first panel 12 and a second rivet 20 placed between the first panel 12 and the second panel 14.

The joint structure 10 can be applied, for example, to a case where two panels that comprise different types of materials and are used for structural parts are joined to one another. As the structural parts, structural parts used in vehicles, for example, can be applied.

In the case of applying the joint structure 10 of the present embodiment to a vehicle, for example, the joint structure 10 can be applied to the joint portion between a roof panel and a roof side rail (roof side outer) or the joint portion between a floor panel and a rocker (rocker inner panel). It should be noted that the joint structure 10 is not limited to these joint portions in a vehicle and that the joint structure 10 may also be applied to other sites of a vehicle.

The first panel 12 is, for example, configured by a panel that has a large surface area and little effect on strength relating to crashes and durability. The first panel 12 is formed of a lightweight material (a material such as carbon fiber-reinforced plastic (CFRP), aluminum alloy, or magnesium alloy) serving as the first material. In the present embodiment, the first panel 12 is formed of carbon fiber-reinforced plastic (CFRP). The first panel 12 can, for example, be applied to a panel portion having a large surface area, such as a roof panel or a floor panel, in the case of applying it to a vehicle.

The second panel 14 is, for example, a skeletal member and is configured by a member requiring strength relating to crashes and durability. For this reason, the second panel 14 is formed of a metal material (in the present embodiment, a steel panel) different from the first material.

The first rivet 18 and the second rivet 20 that configure the rivet 16 are made of the same steel as the metal material configuring the second panel 14. It should be noted that the material of the rivet 16 is not limited to this and that the rivet 16 may also be formed of a material different from the material configuring the second panel 14. In this case, the rivet 16 is selected from materials joined by welding to the second panel 14. For example, for the rivet 16 and the second panel 14, combinations such as iron and stainless steel, and stainless steel and aluminum alloy, can be applied.

The first rivet 18 is equipped with a head portion 18A and a shaft portion 18B. In the present embodiment, the head portion 18A is formed in a substantially circular shape as seen in a plan view, but it is not limited to this and may also be formed in a polygonal shape, a rectangular shape, an elliptical shape, or an oval shape. The shaft portion 18B passes through a through hole 12A formed in the first panel 12, and the head portion 18A is placed in contact with the surface of the first panel 12 on the side opposite the second panel 14 side. A recessed portion 18C serving as an engagement portion sunken in a recessed manner is formed in the distal end surface of the shaft portion 18B of the first rivet 18.

The second rivet 20 is equipped with a seat portion 20A serving as a sandwiching portion in contact with the surface of the first panel 12 on the second panel 14 side. A raised portion 20B serving as an engagement counterpart portion engaged with the recessed portion 18C of the first rivet 18 is formed on one surface of the seat portion 20A. The seat portion 20A is placed between the first panel 12 and the second panel 14. The seat portion 20A is in contact with the first panel 12 and the second panel 14 in the region around the through hole 12A (surfaces larger than the diameter of the through hole 12A) through which the shaft portion 18B of the first rivet 18 passes. A joint portion 20C joined to the second panel 14 is disposed in the central portion of the seat portion 20A of the second rivet 20. In the present embodiment, the shaft portion 18B and the joint portion 20C placed on the shaft portion 18B side are separately configured.

The raised portion 20B of the second rivet 20 is engaged with the recessed portion 18C of the first rivet 18, and the seat portion 20A of the second rivet 20 is placed in contact with the first panel 12 and the second panel 14. Because of this, both surfaces of the first panel 12 are sandwiched between the head portion 18A of the first rivet 18 and the seat portion 20A of the second rivet 20. Because the seat portion 20A of the second rivet 20 is placed between the first panel 12 and the second panel 14, a substantially uniform space can be stably ensured between the first panel 12 and the second panel 14. That is, the seat portion 20A of the second rivet 20 functions as a spacer that maintains the space between the first panel 12 and the second panel 14.

The distal end portion of the shaft portion 18B of the first rivet 18, the joint portion 20C positioned in the central portion of the seat portion 20A of the second rivet 20, and the second panel 14 are joined to one another by resistance welding (spot welding). Because of this, a weld nugget 24 is formed in the distal end portion of the shaft portion 18B of the first rivet 18, the joint portion 20C of the second rivet 20, and part of the second panel 14.

The region between the first panel 12 and the second panel 14 in the area around the seat portion 20A is filled with an adhesive 22. That is, the first panel 12 and the second panel 14 are adhered to one another by the adhesive 22. Because the area around the seat portion 20A is filled with the adhesive 22, the occurrence of corrosion caused by galvanic corrosion between the first panel 12 and the rivet 16 and second panel 14 which comprise different materials is controlled.

Usually it is impossible for the second panel 14 comprising a steel panel and the first panel 12 comprising a lightweight material (a different type of material) different from the steel panel to be joined to one another by spot welding (resistance welding).

In the joint structure 10 of the present embodiment, the shaft portion 18B of the first rivet 18 is passed through the through hole 12A in the first panel 12, and the head portion 18A of the first rivet 18 is brought into contact with the first panel 12. Moreover, the raised portion 20B of the second rivet 20 is brought into engagement with the recessed portion 18C of the first rivet 18, and the second panel 14 is brought into contact with the seat portion 20A of the second rivet 20. Additionally, the distal end portion of the shaft portion 18B of the first rivet 18, the joint portion 20C of the second rivet 20, and the second panel 14 are joined to one another by spot welding. At that time, a gap is formed between the first panel 12 and the second panel 14 because of the seat portion 20A of the second rivet 20, so division of electrical current during the spot welding is controlled. Because of this, the spot weld of the distal end portion of the shaft portion 18B of the first rivet 18, the joint portion 20C of the second rivet 20, and the second panel 14 can be given substantially uniform weld strength.

A sealant 26 is applied along the circumferential direction of the head portion 18A of the first rivet 18 to the area around the head portion 18A in contact with the first panel 12. Because the sealant 26 is applied, the occurrence of corrosion caused by galvanic corrosion between the head portion 18A of the first rivet 18 and the first panel 12 is controlled.

In the case of applying the joint structure 10 of the present embodiment to a vehicle, the effect of reducing fuel consumption and exhaust gas resulting from a reduction in the weight of the vehicle body and the effect of improving maneuvering stability resulting from a reduction in the mass of the parts of the vehicle are obtained by employing the first panel 12 comprising a lightweight material for the roof panel and/or the floor panel or the like. In particular, the roof panel is a part located in a position higher than the height of the center of gravity of the vehicle, so the effect of improving maneuvering stability is great. It is believed that instances where roof panels and floor panels having a large surface area and little effect on strength relating to crashes and durability undergo a replacement from heavy steel panels to lightweight materials such as carbon fiber-reinforced plastic (CFRP) and aluminum alloy will henceforth increase even more. In this case, the present embodiment can be applied because the roof panel and the roof side rails (roof side outers) will entail the joining of different types of materials and the floor panel and the rockers (rocker inner panels) will entail the joining of different types of materials.

Next, a method of manufacturing the joint structure 10 of the present embodiment will be described.

First, the shaft portion 18B of the first rivet 18 is driven by a press or the like into the first panel 12 formed of the lightweight material. At this time, the through hole 12A may be formed beforehand in the first panel 12 or may be formed as a result of being self-pressed by the first rivet. Furthermore, the shaft portion 18B of the first rivet 18 may also be subjected to a knurling process (a process that forms plural grooves in the direction orthogonal to the first panel 12) to deter it from turning relative to the through hole 12A.

Moreover, the raised portion 20B of the second rivet 20 is brought into engagement with the recessed portion 18C of the first rivet 18. Because of this, the first rivet 18 and the second rivet 20 are provisionally secured to one another. At that time, the raised portion 20B of the second rivet 20 is press-fitted by a press or the like into the recessed portion 18C of the first rivet 18. Furthermore, instead of this, threads may also be cut in the recessed portion of the first rivet and in the raised portion of the second rivet, so that, by rotating the second rivet, the raised portion and the recessed portion are screwed and fastened to one another. Because of this, both surfaces of the first panel 12 become sandwiched between the head portion 18A of the first rivet 18 and the seat portion 20A of the second rivet 20. At that time, it is not necessary for the first rivet 18 and the second rivet 20 to be strongly secured to one another because they are joined to one another by spot welding thereafter.

Moreover, the adhesive 22 is applied to the first panel 12 in the area around the seat portion 20A of the second rivet 20. Furthermore, instead of this, the adhesive 22 may also be applied to the position on the second panel 14 corresponding to the area around the seat portion 20A of the second rivet 20. Thereafter, the second panel 14 is brought into contact with the seat portion 20A of the second rivet 20.

Then, the distal end portion of the shaft portion 18B of the first rivet 18, the joint portion 20C in the central portion of the second rivet 20, and the second panel 14 are joined to one another by spot welding. At that time, one spot weld electrode tip 30 is applied to the upper surface of the head portion 18A of the first rivet 18 and another spot weld electrode tip 32 is applied to the undersurface of the second panel 14 under the second rivet 20. At this time, the spot weld electrode tip 30 and the spot weld electrode tip 32 are placed in such a way that their axes substantially coincide with one another. In this state, current flows in the spot weld electrode tip 30 and the spot weld electrode tip 32, whereby the weld nugget 24 is formed ranging over the distal end portion of the shaft portion 18B of the first rivet 18, the joint portion 20C of the second rivet 20, and part of the second panel 14, and these are joined to one another. In other words, the welding conditions are set in such a way that the weld nugget 24 extends over the distal end portion of the shaft portion 18B of the first rivet 18, the joint portion 20C of the second rivet 20, and the second panel 14.

At that time, a gap is formed between the first panel 12 and the second panel 14 because of the seat portion 20A of the second rivet 20, so division of electrical current during the spot welding is controlled. Because of this, the spot weld of the distal end portion of the shaft portion 18B of the first rivet 18, the joint portion 20C of the second rivet 20, and the second panel 14 can be given substantially uniform weld strength.

Thereafter, electrodeposition coating or the like is implemented on the first panel 12 and the second panel 14 and thus the adhesive 22 completely hardens. Because the first panel 12 and the second panel 14 are adhered to one another by the adhesive 22, the joint between the first panel 12 and the second panel 14 can be made stronger. Moreover, because of the adhesive 22, the occurrence of corrosion caused by galvanic corrosion between the first panel 12 and the rivet 16 (the first rivet 18 and the second rivet 20) and second panel 14 which comprise different materials can be controlled.

Furthermore, the sealant 26 is applied along the circumferential direction of the head portion 18A of the first rivet 18 to the area around the head portion 18A in contact with the first panel 12. Because of the sealant 26, the occurrence of corrosion caused by galvanic corrosion between the head portion 18A of the first rivet 18 and the first panel 12 can be controlled.

It should be noted that the sealant 26 may also be dispensed with by administering to the surface of the first rivet 18 a surface treatment for preventing galvanic corrosion.

Next, the action and effects of the present embodiment will be described.

In the joint structure 10 of the present embodiment, the shaft portion 18B of the first rivet 18 is passed through the through hole 12A in the first panel 12, and the head portion 18A of the first rivet 18 is in contact with the first panel 12. Furthermore, the raised portion 20B of the second rivet 20 is engaged with the recessed portion 18C of the first rivet 18, and the seat portion 20A of the second rivet 20 is in contact with the surface of the first panel 12 on the second panel 14 side. The second panel 14 is in contact with the seat portion 20A of the second rivet 20, and the region between the first panel 12 and the second panel 14 in the area around the seat portion 20A of the second rivet 20 is filled with the adhesive 22. In this state, the distal end portion of the shaft portion 18B of the first rivet 18, the joint portion 20C in the central portion of the second rivet 20, and the second panel 14 are joined to one another by resistance welding (spot welding).

In this joint structure 10, both surfaces of the first panel 12 are sandwiched between the head portion 18A of the first rivet 18 and the seat portion 20A of the second rivet 20, so the seat portion 20A (the joint portion 20C) of the second rivet 20 can be brought into contact with the second panel 14 in a state in which a space between the first panel 12 and the second panel 14 is ensured, and joint stability during the welding can be improved. In particular, the seat portion 20A of the second rivet 20 is in stable contact with the second panel 14 in a wider range than the through hole 12A, so joint stability when welding the distal end portion of the shaft portion 18B of the first rivet 18, the joint portion 20C of the second rivet 20, and the second panel 14 to one another is improved.

Usually when the first panel is formed of carbon fiber-reinforced plastic (CFRP), for example, there is the potential for the creep phenomenon (a phenomenon where the shape of the first panel becomes deformed due to thermal expansion and the first panel cools and contracts in that situation) to occur under high temperatures in a natural environment and baking in the coating process. If, for example, the first panel and the second panel are joined to one another by a rivet or a nut and bolt in a state in which a predetermined space is not maintained between the first panel and the second panel, there is the potential for instability (a gap) to arise between the head portion of the rivet and the first panel or second panel due to the creep phenomenon. Furthermore, in the case of fastening with a nut and bolt, there is the potential for slackness in the fastening structure to arise.

In the case of fastening with a nut and bolt, slackness in the fastening structure resulting from the creep phenomenon can also be remedied by placing a collar between the first panel and the second panel, but then the number of parts increases, the nut must be welded beforehand to the second panel or the first panel, the collar must be set, the bolt must be fastened, and productivity declines markedly due to an increase in the number of production man-hours.

In contrast, in the joint structure 10 of the present embodiment, even if instability (a gap) arises between the head portion 18A of the first rivet 18 and the second panel 14 (even if the axial force drops), stable joint strength and rigidity can be ensured because the first panel 12 is sandwiched between the head portion 18A of the first rivet 18 and the seat portion 20A of the second rivet 20.

Furthermore, compared to a fastening structure resulting from a nut and bolt and collar, an increase in the number of parts can be controlled and an increase in the number of production man-hours can be controlled.

Furthermore, because of the seat portion 20A of the second rivet 20, a substantially uniform space can be stably ensured between the first panel 12 and the second panel 14. Because of this, when joining the distal end portion of the shaft portion 18B of the first rivet 18, the joint portion 20C of the second rivet 20, and the second panel 14 to one another by resistance welding (spot welding), division of electrical current can be controlled and the occurrence of weld defects can be prevented or controlled.

Usually if resistance welding (spot welding) is implemented when joining a panel made of aluminum alloy, carbon fiber-reinforced plastic (CFRP) or the like to a skeletal member comprising a steel panel, it is easy for joint defects caused by division of electrical current to occur due to the conductivity of the panel made of aluminum alloy or carbon fiber-reinforced plastic (CFRP) or the like being high.

In contrast, in the joint structure 10 of the present embodiment, a space can be reliably set between the first panel 12 and the second panel 14 because of the seat portion 20A of the second rivet 20, so division of electrical current during the spot welding can be controlled and the occurrence of joint defects can be prevented or controlled.

Furthermore, even if the neighborhood of the shaft portion 18B of the first rivet 18 and/or the joint portion 20C and seat portion 20A of the second rivet 20 melts and is welded by spot welding, the first panel 12 is sandwiched in a wide range between the head portion 18A of the first rivet 18 and the seat portion 20A of the second rivet 20 and joined. For this reason, even if the thickness in the neighborhood of the joint of the first panel 12 sandwiched between the first rivet 18 and the second rivet 20 decreases, this can be prevented or controlled from leading to a drop in strength and rigidity.

Furthermore, the region between the first panel 12 and the second panel 14 in the area around the seat portion 20A of the second rivet 20 is filled with the adhesive 22. That is, the space between the first panel 12 and the second panel 14 is stable because of the seat portion 20A of the second rivet 20, so the adhesive 22 can stably stay in a substantially uniform thickness between the first panel 12 and the second panel 14. Because of the adhesive 22, the occurrence of corrosion caused by galvanic corrosion between the first panel 12 and the rivet 16 and second panel 14 which comprise different materials can be controlled. Usually in the section where different types of materials are in contact, there is the potential for galvanic corrosion, in which the material having the higher potential corrodes, to occur, but in the present embodiment the region between the first panel 12 and the second panel 14 is filled with the adhesive 22, so the occurrence of corrosion caused by galvanic corrosion between the first panel 12 and the rivet 16 (the first rivet 18 and the second rivet 20) and second panel 14 can be controlled.

Furthermore, because the adhesive 22 is placed in a substantially uniform thickness between the first panel 12 and the second panel 14, the reinforcement effect and waterproofing effect resulting from the adhesive 22 can also be exhibited to the fullest extent.

It should be noted that, in the present embodiment, a sealant may also be applied instead of the adhesive 22.

Furthermore, because the recessed portion 18C of the shaft portion 18B of the first rivet 18 is engaged with the raised portion 20B of the second rivet 20, it is easy to put together the first rivet 18 and the second rivet 20. Because of this, the first rivet 18 and the second rivet 20 are kept from going out of alignment with one another, and workability during the welding and so forth can be improved.

In this way, in the joint structure 10 of the present embodiment, even in a case where the first panel 12 comprising the lightweight material is employed, a stable joint with the second panel 14 can be realized because of the first rivet 18 and the second rivet 20. For example, in a case where the joint structure 10 of the present embodiment is employed for the joint portions between the roof panel and the roof side rails of a vehicle and the joint portions between the floor panel and the rockers, the effect of reducing fuel consumption and exhaust gas resulting from a reduction in the weight of the vehicle body and maneuvering stability resulting from a reduction in the mass of the parts of the vehicle can be improved. In particular, the roof panel is a part placed in a position higher than the height of the center of gravity of the vehicle, so maneuvering stability can be more effectively improved.

Next, a second embodiment of the joint structure pertaining to the present invention will be described using FIG. 2. It should be noted that, in the second embodiment, identical reference signs are assigned to constituent elements and members identical to those in the first embodiment and detailed description of those constituent elements and members will be omitted.

Figure 2:
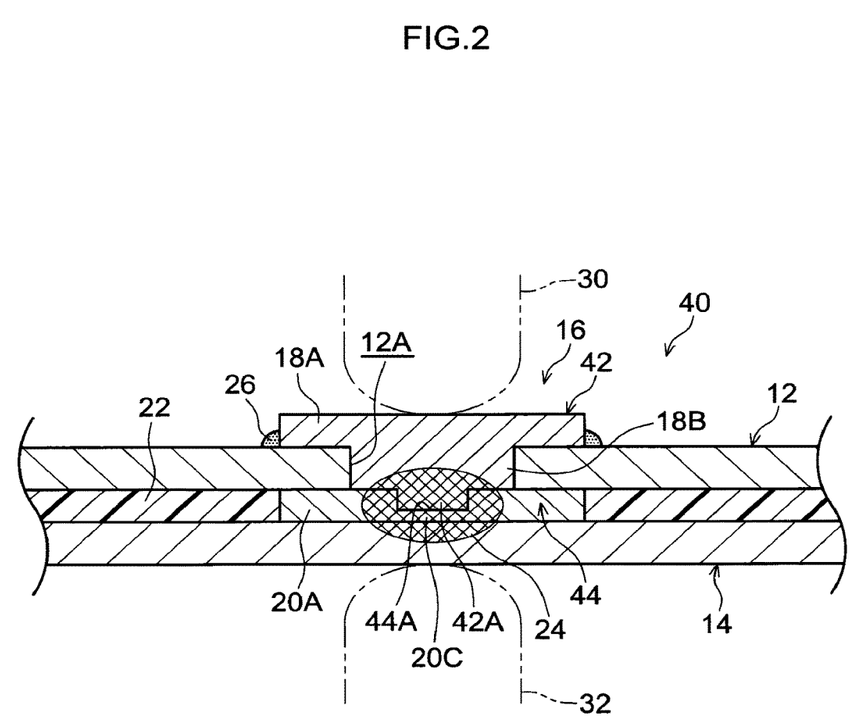
FIG. 2 is a cross-sectional view showing a joint structure pertaining to a second embodiment.

As shown in FIG. 2, in a joint structure 40 of the present embodiment, the rivet 16 is divided into a first rivet 42 and a second rivet 44. The first rivet 42 is equipped with a raised portion 42A serving as an engagement portion that projects in a raised manner on the distal end surface of the shaft portion 18B. A recessed portion 44A serving as an engagement counterpart portion with which the raised portion 42A is engaged is formed in the seat portion 20A of the second rivet 44. Additionally, the raised portion 42A of the first rivet 42 is engaged with the recessed portion 44A of the second rivet 44 in a state in which the shaft portion 18B of the first rivet 42 has been passed through the through hole 12A in the first panel 12. Because of the seat portion 20A of the second rivet 44, a substantially uniform space is ensured between the first panel 12 and the second panel 14. In this state, the distal end portion of the shaft portion 18B of the first rivet 42, the joint portion 20C in the central portion of the seat portion 20A of the second rivet 44, and the second panel 14 are joined to one another by spot welding.

In this joint structure 40, by bringing the raised portion 42A of the first rivet 42 into engagement with the recessed portion 44A of the second rivet 44, it becomes easy to put together the first rivet 42 and the second rivet 44 and workability can be improved.

Next, a third embodiment of the joint structure pertaining to the present invention will be described using FIG. 3. It should be noted that, in the third embodiment, identical reference signs are assigned to constituent elements and members identical to those in the first and second embodiments and detailed description of those constituent elements and members will be omitted.

Figure 3:
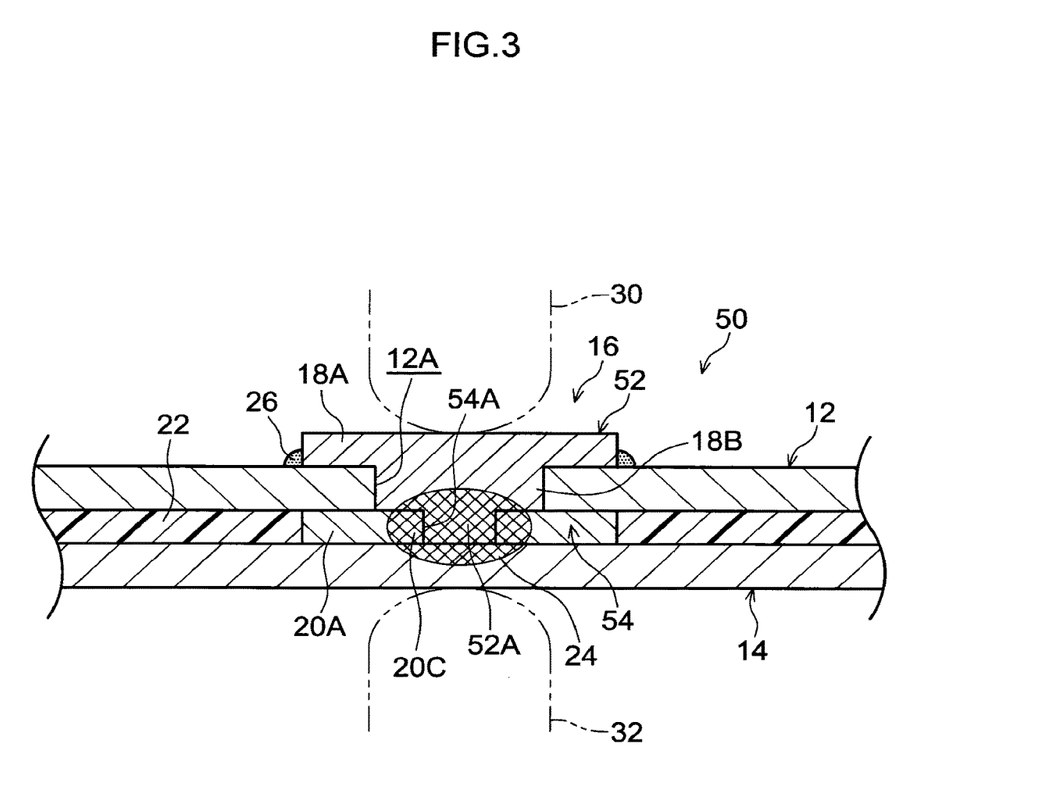
FIG. 3 is a cross-sectional view showing a joint structure pertaining to a third embodiment.

As shown in FIG. 3, in a joint structure 50 of the present embodiment, the rivet 16 is divided into a first rivet 52 and a second rivet 54. The first rivet 52 is equipped with a projecting portion 52A serving as an engagement portion that projects in a raised manner on the distal end surface of the shaft portion 18B. An open portion 54A serving as an engagement counterpart portion with which the projecting portion 52A is engaged is formed in the seat portion 20A of the second rivet 54. In the present embodiment, for example, the outer shape of the projecting portion 52A and the outer shape of the open portion 54A are substantially circular. The diameter of the projecting portion 52A is set smaller than the diameter of the shaft portion 18B. The diameter (outer diameter) of the projecting portion 52A is set slightly smaller than the inner diameter of the open portion 54A. It should be noted that, as long as the projecting portion 52A can engage with the open portion 54A, their shapes can be changed to other shapes, such as rectangular.

In this joint structure 50, the projecting portion 52A of the first rivet 52 is engaged with the open portion 54A of the second rivet 54 in a state in which the shaft portion 18B of the first rivet 52 has been passed through the through hole 12A in the first panel 12. Because of the seat portion 20A of the second rivet 54, a substantially uniform space is ensured between the first panel 12 and the second panel 14. In this state, the distal end portion (the region including the projecting portion 52A) of the shaft portion 18B of the first rivet 52, the joint portion 20C in the central portion of the seat portion 20A of the second rivet 54, and the second panel 14 are joined to one another by spot welding. That is, the weld nugget 24 is formed in a region ranging over the distal end portion (the region including the projecting portion 52A) of the shaft portion 18B of the first rivet 52, the joint portion 20C of the second rivet 54, and the second panel 14.

In this joint structure 50, by bringing the projecting portion 52A of the first rivet 52 into engagement with the open portion 54A of the second rivet 54, it becomes easy to put together the first rivet 52 and the second rivet 54 and workability can be improved.

Furthermore, the joint structure 50 is easy to manufacture because it suffices to form the open portion 54A in the seat portion 20A of the second rivet 54.

It should be noted that, instead of the configuration of the third embodiment, the projecting portion 52A may also not be disposed on the first rivet 52 and the open portion of the second rivet 54 may also be set to a size with which the shaft portion 18B of the first rivet 52 is engaged. In this case, it is more preferred that threads be cut in the shaft portion 18B of the first rivet 52 and the open portion of the second rivet 54 to set up a fastening structure to thereby secure the second rivet 54 to the first rivet 52.

It should be noted that any of the joint structures of the first to third embodiments can be appropriately selected depending, for example, on the ease of putting together the first rivet and the second rivet, positional relationships, and the specifications of the spot welding machine.

Next, a fourth embodiment of the joint structure pertaining to the present invention will be described using FIG. 4 and FIG. 5. It should be noted that, in the fourth embodiment, identical reference signs are assigned to constituent elements and members identical to those in the first to third embodiments and detailed description of those constituent elements and members will be omitted.

Figure 4:
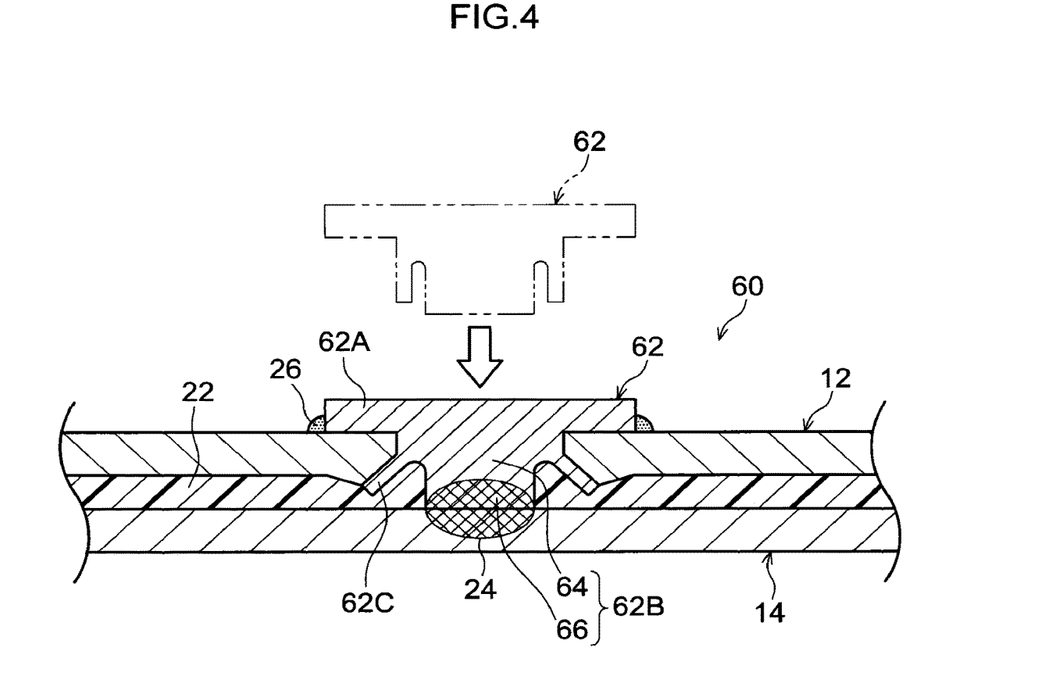
FIG. 4 is a cross-sectional view showing a joint structure pertaining to a fourth embodiment.
Figure 5:
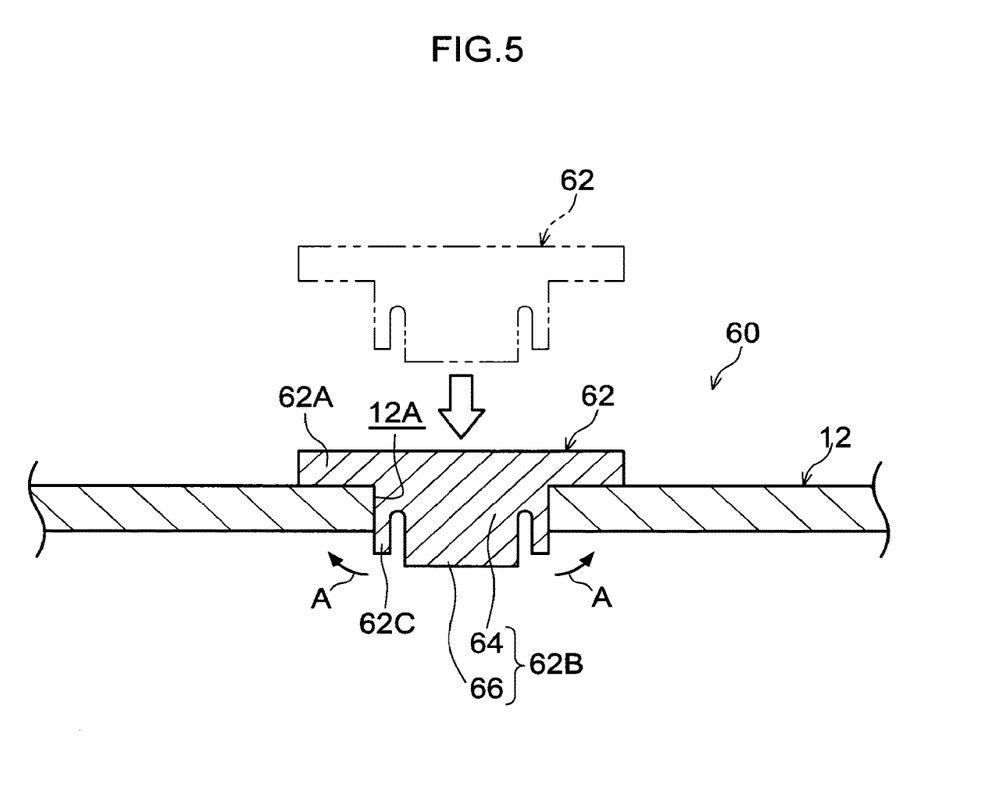
FIG. 5 is a cross-sectional view for describing the process of manufacturing the joint structure shown in FIG. 4.

In FIG. 4 the overall configuration of a joint structure 60 of the present embodiment is shown in a cross-sectional view, and in FIG. 5 the process of attaching a rivet 62 used in the joint structure 60 is shown in a cross-sectional view.

As shown in FIG. 4 and FIG. 5, the joint structure 60 of the present embodiment is equipped with a rivet 62 that joins the first panel 12 and the second panel 14 to one another. The rivet 62 comprises one part and is not divided into two parts like in the first to third embodiments.

As shown in FIG. 5, the rivet 62 is equipped with a head portion 62A, a shaft body 62B that projects from the head portion 62A, and a claw portion 62C that is disposed around the shaft body 62B. The shaft body 62B is equipped with a shaft portion 64 formed continuously with the head portion 62A and a joint portion 66 disposed on the distal end side of the shaft portion 64. That is, in the present embodiment, the shaft portion 64 and the joint portion 66 are integrally formed. The base portion (on the side of the head portion 62A) of the claw portion 62 is formed continuously with the base portion of the shaft portion 64.

The claw portion 62C extends along the axial direction of the shaft portion 64 and is spaced apart from the peripheral surface of the shaft portion 64. The length (axial direction length) of the claw portion 62C is set shorter than the axial direction length of the shaft body 62B. Furthermore, in the present embodiment, the claw portion 62C is disposed along substantially the entire circumferential direction of the shaft body 62B (the shaft portion 64). It should be noted that, instead of this, the claw portion may be disposed just along part of the circumferential direction of the shaft body 62B or may be divided in the circumferential direction of the shaft body 62B and plurally disposed.

Here, a method of manufacturing the joint structure 60 of the present embodiment will be described.

As shown in FIG. 5, the shaft body 62B and the claw portion 62C of the rivet 62 are passed through the insertion hole 12A in the first panel 12, and the head portion 62A of the rivet 62 is brought into contact with the first panel 12. In this state, a load is applied by a press or the like to thereby push open the claw portion 62C in a direction away from the shaft body 62B (the shaft portion 64) as indicated by arrows A. Because of this, as shown in FIG. 4, the claw portion 62C becomes deformed in a direction away from the shaft body 62B, and the peripheral edge of the through hole 12A in the first panel 12 becomes crushed and deformed as a result of being pressed by the claw portion 62C. Because of this, the claw portion 62C becomes caught on a site of the first panel 12 on the second panel 14 side, and the first panel 12 is sandwiched between the head portion 62A and the claw portion 62C of the rivet 62. That is, in the present embodiment, as shown in FIG. 4, the deformed claw portion 62C becomes a sandwiching portion that sandwiches between itself and the head portion 62A the first panel 12 from the second panel 14 side.

Moreover, the adhesive 22 is applied to the first panel 12 in the area around the shaft body 62B of the rivet 62 or to the position on the second panel 14 corresponding to the area around the shaft body 62B, and the second panel 14 is brought into contact with the distal end surface of the joint portion 66 of the rivet 62. Thereafter, the joint portion 66 of the rivet 62 and the second panel 14 are joined to one another by spot welding.

In this joint structure 60, the first panel 12 and the second panel 14 can be joined to one another by the (single) rivet 62 comprising one part. Furthermore, the space between the first panel 12 and the second panel 14 is stably maintained because the first panel 12 is sandwiched between the head portion 62A and the claw portion 62C of the rivet 62 and the distal end surface of the joint portion 66 of the shaft body 62B is in contact with the second panel 14, so joint stability during the welding is improved. Furthermore, because the space between the first panel 12 and the second panel 14 is stabilized, when joining the joint portion 66 of the rivet 62 and the second panel 14 to one another by spot welding, division of electrical current can be controlled and the occurrence of weld defects can be prevented or controlled.

Moreover, even if deformation resulting from thermal expansion occurs in the first panel 12 or the second panel 14 under a high-temperature environment, stable joint strength can be obtained because the first panel 12 is sandwiched between the head portion 62A and the claw portion 62C of the rivet 62.

In the first and second embodiments, the shaft portion 18B is disposed on the first rivet, but the joint structure is not limited to this configuration. The joint structure may also have a configuration where, for example, the shaft portion is not disposed on the first rivet, the seat portion and the shaft portion are disposed on the second rivet, and the first rivet and the second rivet are brought into contact with one another.

In the first to fourth embodiments, the first panel and the second panel are not limited to the materials described in the first embodiment and can be changed to other materials provided that they are formed of different materials. That is, the present invention can be applied to a case where both the first panel and the second panel are metal and a case where the first panel is resin and the second panel is metal.

The disclosure of Japanese Patent Application No. 2013-156869 is incorporated in its entirety by reference herein.

All documents, patent applications, and technical standards mentioned in this specification are incorporated by reference herein to the same extent as if each individual document, patent application, and technical standard were specifically and individually indicated to be incorporated by reference.

The invention claimed is:

1. A joint structure comprising:
   a first panel comprising a first material;
   a second panel comprising a metal material different from the first material;
   a rivet having a head portion that is placed in contact with the first panel, a shaft portion that is passed through the first panel, and a joint portion that is disposed on the shaft portion side and is in contact with and joined by welding to the second panel; and
   a sandwiching portion that is disposed at the rivet and sandwiches, between itself and the head portion, the first panel from the second panel side, wherein
   the rivet is divided into
      a first rivet that is equipped with the head portion and the shaft portion and
      a second rivet that is at least equipped with the joint portion, is in contact with the first rivet, and is in contact with the second panel, just the shaft portion of the first rivet is in contact with a though hole running through the first panel, and the sandwiching portion is a seat portion that is formed at the second rivet and is in contact with the first panel and the second panel in a region around the through hole at which the shaft portion passes through the first panel.

2. The joint structure according to claim 1, wherein an engagement portion engaged with an engagement counterpart portion formed at the second rivet is formed at the first rivet.

3. The joint structure according to claim 1, wherein a region between the first panel and the second panel in an area around the rivet is filled with an adhesive.

4. The joint structure according to claim 1, wherein the first material is a resin.

5. A manufacturing method for manufacturing the joint structure according to claim 1, the joint structure manufacturing method comprising:
- a step of passing the shaft portion disposed at the first rivet through the first panel;
- a step of sandwiching, with the head portion and the seat portion, the first panel by bringing the head portion into contact with the first panel, bringing the second rivet into contact with the first rivet, and bringing the seat portion of the second rivet into contact with the first panel; and
- a step of bringing the second panel into contact with the seat portion and securing at least the joint portion of the second rivet and the second panel to one another by welding.

6. The joint structure manufacturing method according to claim 5, wherein, in the step of bringing the second rivet into contact with the first rivet and bringing the seat portion of the second rivet into contact with the first panel, an engagement portion disposed at the first rivet is brought into engagement with an engagement counterpart portion disposed at the second rivet.

7. The joint structure manufacturing method according to claim 5, further comprising a step of applying an adhesive to the first panel or the second panel at least in an area around the joint portion before the step of securing by welding.

8. The joint structure manufacturing method according to claim 5, wherein the first material forming the first panel is a resin.

9. A joint structure comprising:
- a first panel comprising a first material;
- a second panel comprising a metal material different from the first material;
- a rivet having a head portion that is placed in contact with the first panel, a shaft portion that is passed through the first panel, and a joint portion that is disposed on the shaft portion side and is in contact with and joined by welding to the second panel; and
- a sandwiching portion that is disposed at the rivet and sandwiches, between itself and the head portion, the first panel from the second panel side, wherein
- the sandwiching portion is configured by a claw portion that is in contact with a site of the first panel on the second panel side on an outer peripheral side of the shaft portion in a state in which the shaft portion has been passed through the first panel, and
- the shaft portion or the joint portion is formed longer in an axial direction than the claw portion.

10. A manufacturing method for manufacturing a joint structure having
- a first panel comprising a first material,
- a second panel comprising a metal material different from the first material,
- a rivet having a head portion that is placed in contact with the first panel, a shaft portion that is passed through the first panel, and a joint portion that is disposed on the shaft portion side and is in contact with and joined by welding to the second panel, and
- a sandwiching portion that is disposed at the rivet and sandwiches, between itself and the head portion, the first panel from the second panel side,
- the sandwiching portion being configured by a claw portion that is in contact with a site of the first panel on the second panel side on an outer peripheral side of the shaft portion in a state in which the shaft portion has been passed through the first panel, and
- the shaft portion or the joint portion being formed longer in an axial direction than the claw portion, the joint structure manufacturing method comprising:
- a step of passing the shaft portion and the claw portion of the rivet through the first panel;
- a step of deforming the claw portion to thereby bring the claw portion into contact with the site of the first panel on the second panel side and sandwiching the first panel between the head portion and the claw portion; and
- a step of bringing the joint portion into contact with the second panel and securing the joint portion and the second panel to one another by welding.

* * * * *